(12) United States Patent
Adachi et al.

(10) Patent No.: US 11,551,455 B2
(45) Date of Patent: Jan. 10, 2023

(54) IMAGE PROCESSING APPARATUS, SYSTEM, CONTROL METHOD FOR IMAGE PROCESSING APPARATUS, AND NON-TRANSITORY COMPUTER-READABLE STORAGE MEDIUM

(71) Applicant: CANON KABUSHIKI KAISHA, Tokyo (JP)

(72) Inventors: Takashi Adachi, Saitama (JP); Mari Yamasaki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/877,921

(22) Filed: May 19, 2020

(65) Prior Publication Data
US 2020/0372259 A1 Nov. 26, 2020

(30) Foreign Application Priority Data
May 23, 2019 (JP) .............................. JP2019-097071

(51) Int. Cl.
| | | |
|---|---|---|
| G06T 9/00 | (2006.01) |
| G06V 20/52 | (2022.01) |
| H04N 5/232 | (2006.01) |
| G06T 7/73 | (2017.01) |
| G06V 40/20 | (2022.01) |

(52) U.S. Cl.
CPC ................ G06V 20/53 (2022.01); G06T 7/73 (2017.01); G06V 40/25 (2022.01); H04N 5/23219 (2013.01)

(58) Field of Classification Search
CPC ............ G06K 9/00778; G06K 9/00348; G06T 7/73; H04N 5/23219
USPC ...................................................... 382/103
See application file for complete search history.

(56) References Cited

U.S. PATENT DOCUMENTS

| | | | |
|---|---|---|---|
| 8,098,888 B1 * | 1/2012 | Mummareddy ... | G06K 9/00778 382/103 |
| 9,794,463 B2 | 10/2017 | Adachi | |
| 10,104,279 B2 | 10/2018 | Adachi | |
| 2009/0164284 A1 * | 6/2009 | Koiso .................... | G06Q 10/00 705/7.29 |
| 2020/0184205 A1 | 6/2020 | Yamasaki et al. | |

FOREIGN PATENT DOCUMENTS

| | | |
|---|---|---|
| JP | 2015069639 A | 4/2015 |
| JP | 2017147689 A | 8/2017 |
| JP | 2017182654 A | 10/2017 |
| JP | 6256885 B2 | 1/2018 |

* cited by examiner

*Primary Examiner* — Stephen P Coleman
(74) *Attorney, Agent, or Firm* — Carter, DeLuca & Farrell LLP

(57) ABSTRACT

An image processing apparatus comprising, a tracking unit configured to detect an object and track the object in images to be processed, the images being sequential with respect to time, a determining unit configured to determine a stay time for which the object stays, on the basis of a result of the tracking, and an associating unit configured to specify, on the basis of the result of the tracking, one predetermined location from one or more predetermined locations included in the images to be processed, and associate the specified one predetermined location with the stay time.

14 Claims, 5 Drawing Sheets

FIG. 6

| STAY START TIME 601 | STAY END TIME 602 | HUMAN BODY IDENTIFICATION INFORMATION 603 | STAY TIME FOR PREDETERMINED LOCATION 1 604 | STAY TIME FOR PREDETERMINED LOCATION 2 605 | STAY TIME FOR PREDETERMINED LOCATION 3 606 |
|---|---|---|---|---|---|
| YYYY/MM/DD 16:00:00 | YYYY/MM/DD 16:05:00 | 1 | 00:05:00 | 0 | 0 |
| YYYY/MM/DD 16:01:30 | YYYY/MM/DD 16:07:00 | 2 | 0 | 00:05:30 | 0 |
| YYYY/MM/DD 16:11:00 | YYYY/MM/DD 16:12:00 | 3 | 0 | 0 | 00:01:00 |

IMAGE PROCESSING APPARATUS, SYSTEM, CONTROL METHOD FOR IMAGE PROCESSING APPARATUS, AND NON-TRANSITORY COMPUTER-READABLE STORAGE MEDIUM

BACKGROUND OF THE INVENTION

Field of the Invention

The present disclosure relates to an image processing apparatus, a system, a control method for an image processing apparatus, and a non-transitory computer-readable storage medium.

Description of the Related Art

Images shot by surveillance cameras, images stored in storage devices after being shot, and the like are increasingly being analyzed and utilized. For example, human body detection and human body tracking techniques can be used to count the number of people in an area, the number of people who have crossed a line, and so on. This makes it possible to understand the state of the activities of human bodies in a specific area, and in particular the amount of time for which the people remain in the specific area. Japanese Patent Laid-Open No. 2015-69639 and Japanese Patent Laid-Open No. 2017-182654 disclose inventions which measure the amount of time a person stays (the stay time) within a specific area.

However, if areas are set for each of predetermined locations where people are handled, such as a single reception desk, and the stay times for which the people stay within the areas are measured, a person may be detected within a plurality of areas. Situations are also conceivable where a person temporarily enters, exits from, or passes through a different area. It is therefore difficult to set areas by predicting the detection locations, movement ranges, and so on of a person.

SUMMARY OF THE INVENTION

Accordingly, a technique is provided which makes it possible to measure a stay time for which an object detected within an image is associated with a predetermined location.

One aspect of embodiments relates to an image processing apparatus comprising, a tracking unit configured to detect an object and track the object in images to be processed, the images being sequential with respect to time, a determining unit configured to determine a stay time for which the object stays, on the basis of a result of the tracking, and an associating unit configured to specify, on the basis of the result of the tracking, one predetermined location from one or more predetermined locations included in the images to be processed, and associate the specified one predetermined location with the stay time.

Further features of the present invention will become apparent from the following description of exemplary embodiments (with reference to the attached drawings).

BRIEF DESCRIPTION OF THE DRAWINGS

FIG. 6 is a diagram illustrating an example of a table in which measurement results are registered, according to an embodiment.

DESCRIPTION OF THE EMBODIMENTS

Figure 1A:
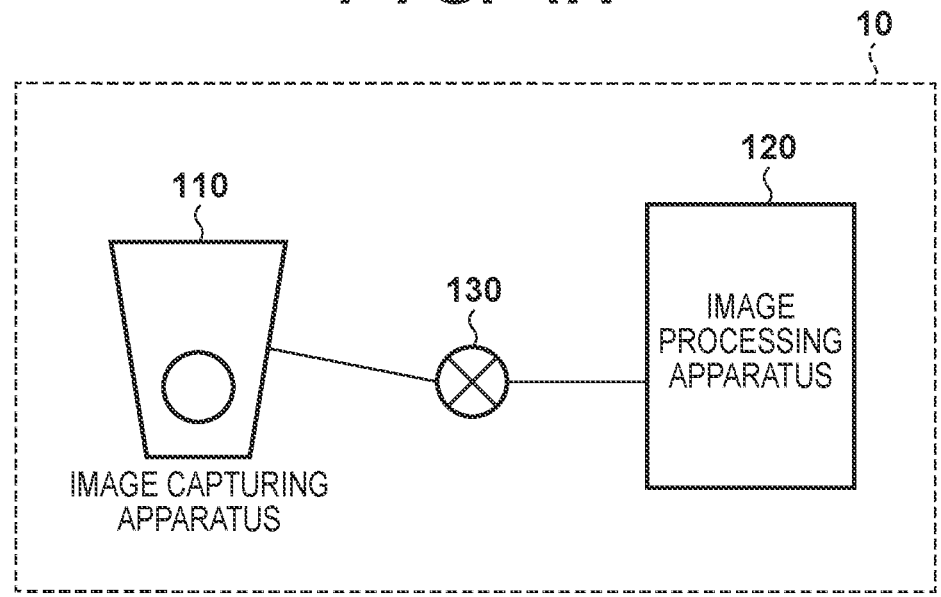
FIG. 1A is a diagram illustrating an example of a system configuration according to an embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

A system configuration according to an embodiment will be described with reference to FIG. 1A. FIG. 1A is a block diagram illustrating an example of the configuration of an image processing system 10 according to the present embodiment. In the present embodiment, the image processing system 10 is employed at a place where customers are handled, such as a reception desk, a customer service counter, or a cash register in a predetermined location in a store, a theater, a movie theater, a stadium, a hospital, a station building, or the like, for example. The image processing system 10 shoots images of people lined up at the reception desk in the predetermined location, and measures the times required to handle those people as "stay times". The image processing system 10 is configured by connecting at least one image capturing apparatus (network camera) 110 with an image processing apparatus 120 over a network 130.

The image capturing apparatus 110 is a surveillance camera installed in a monitored zone such as a store, a theater, a movie theater, a stadium, a hospital, a station building, or the like. The image capturing apparatus 110 is installed so as to shoot a predetermined monitored area in the monitored zone, and has a function for delivering shot images (moving images, still images) to the image processing apparatus 120 over the network 130. A plurality of the image capturing apparatuses 110 may be prepared and installed to shoot a plurality of corresponding monitored areas within the monitored zone.

The image capturing apparatus 110 generates an image by shooting the monitored area within the monitored zone. The image capturing apparatus 110 A/D converts an analog image signal, which has been obtained through photoelectric conversion using an image sensor such as a CCD or a CMOS image sensor, into a digital image signal. The digital image signal is subjected to developing processing such as de-Bayering, white balance processing, tone conversion processing, and the like. The digital image signal output from a development processing unit is furthermore compressed and encoded to generate image data. The image compression method can employ a standard such as H.264, H.265, MJPEG, JPEG, or the like. The image data may furthermore be generated in any desired format, including mp4, avi, or the like. The encoded image data is delivered to the image processing apparatus 120. In addition to still images, the image capturing apparatus 110 can, for example, obtain a predetermined number of frames per second (e.g., 30 frames) of an image to obtain a 30-fps moving image (live video) of the monitored area.

The image processing apparatus 120 can be realized by an information processing apparatus, a communication apparatus, a control apparatus, or the like, such as a personal computer, a server device, a tablet, or the like. The image processing apparatus 120 can communicate with the image capturing apparatus 110 over the network 130 and control the operations of the image capturing apparatus 110. For example, requests can be made for changing the shooting direction and image quality settings of the image capturing apparatus 110, carrying out PTZ control, and the like. Moving images and still images captured by the image capturing apparatus 110 can be received over the network 130. Instead of being realized by a single apparatus, the functions of the image processing apparatus 120 may be realized by a plurality of apparatuses operating cooperatively.

The image processing apparatus 120 may send image capturing control commands to the image capturing apparatus 110. The image capturing apparatus 110 sends responses to those commands to the image processing apparatus 120. The image processing apparatus 120 makes settings pertaining to processing such as determination processing, output processing, and so on for obtained video information.

The network 130 can be constituted by a Local Area Network (LAN). However, the network 130 is not limited to a LAN, and may be the Internet, a Wide Area Network (WAN), or the like. The physical format of the connection to the network 130 may be a wired connection or a wireless connection. Furthermore, although one each of the image capturing apparatus 110 and the image processing apparatus 120 are connected to the network 130 in FIG. 1A, the number of connected devices is not limited to the number illustrated in FIG. 1A, and more devices may be connected.

Figure 1B:
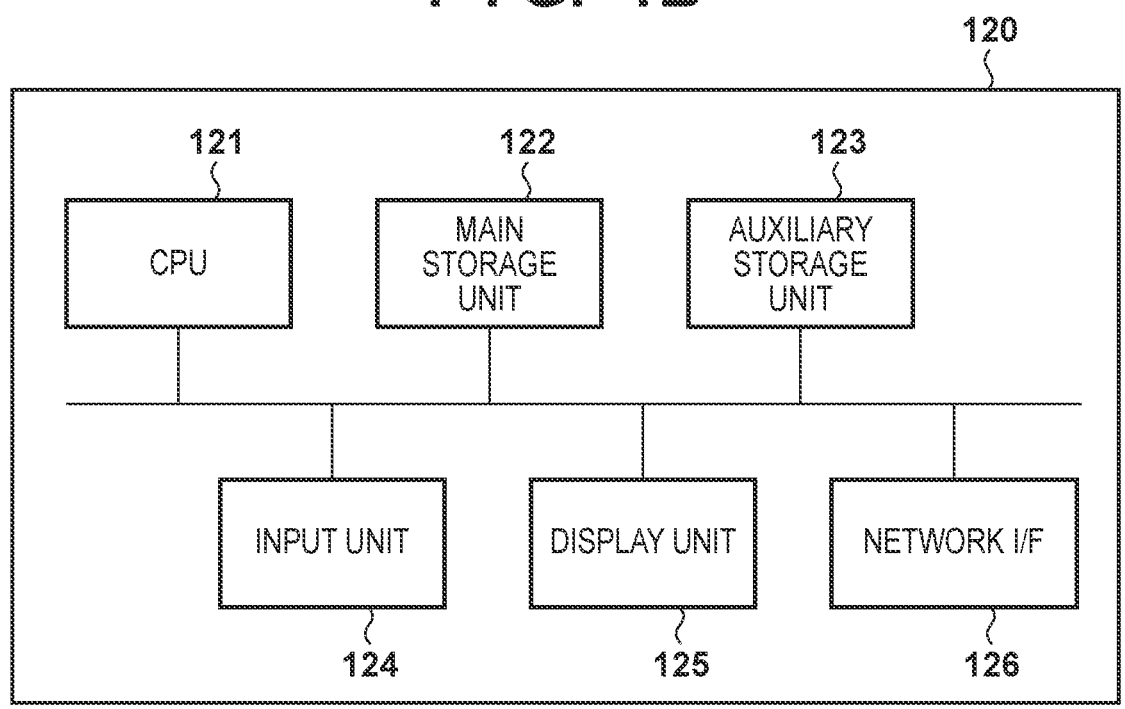
FIG. 1B is a diagram illustrating an example of the hardware configuration of an image processing apparatus according to an embodiment.

Next, the hardware configuration of the image processing apparatus 120 will be described with reference to FIG. 1B. FIG. 1B is a block diagram illustrating an example of the hardware configuration of the image processing apparatus 120 according to this embodiment. The configuration illustrated in FIG. 1B is merely an example of the configuration of the image processing apparatus 120, and can be modified or changed as appropriate.

A CPU 121 executes processes using computer programs, data, and the like stored in a main storage unit 122. As a result, the CPU 121 controls the operations of the image processing apparatus 120 as a whole, and executes the various processes carried out by the image processing apparatus 120 (mentioned later). The CPU 121 realizes the functions described later by executing processes using computer programs, data, and the like stored in the main storage unit 122. The main storage unit 122 is a storage device such as Random Access Memory (RAM).

The main storage unit 122 has an area for storing computer programs, data, and the like loaded from an auxiliary storage unit 123, various types of data and images received from the image capturing apparatus 110 through a network I/F 127 or obtained from files, and so on. The main storage unit 122 further includes a work area used by the CPU 121 when executing various processes. In this manner, the main storage unit 122 can provide various types of areas as appropriate.

The auxiliary storage unit 123 is a high-capacity information storage device such as a Hard Disk Drive (HDD), Read-Only Memory (ROM), or a Solid State Drive (SSD). An operating system (OS), computer programs for causing the CPU 121 to execute the processes carried out by the image processing apparatus 120 (described later), data, and the like are stored in the auxiliary storage unit 123. Various types of data and captured images received from the image capturing apparatus 110 through a network I/F 126, images obtained from another external device connected to the network 130 (an image server or the like), and so on are also stored in the auxiliary storage unit 123. The computer programs, data, and the like stored in the auxiliary storage unit 123 are loaded into the main storage unit 122 as appropriate under the control of the CPU 121, and are then processed by the CPU 121.

An input unit 124 is constituted by a user interface such as a keyboard, a mouse, a touch panel, or the like, and can input various types of instructions to the image processing apparatus 120 by being operated by a user of the image processing apparatus 120. A display unit 125 is constituted by a liquid crystal screen or the like, and is capable of displaying the results of processes performed by the image processing apparatus 120 as images, graphics, text, or the like. The network I/F 126 is an interface used by the image processing apparatus 120 for data communication with the image capturing apparatus 110 over the network 130.

Although FIG. 1B illustrates the image processing apparatus 120 as a single apparatus including the input unit 124 and the display unit 125, the input unit 124 and the display unit 125 may be provided as units separate from the image processing apparatus 120. Alternatively, the display unit 125 may be integrated with the image processing apparatus 120, and the input unit 124 may be provided separately. Alternatively, the input unit 124 may be integrated with the image processing apparatus 120, and the display unit 125 may be provided separately. Furthermore, the input unit 124 and the display unit 125 may be an integrated unit provided separate from the image processing apparatus 120. When the input unit 124 and/or the display unit 125 are units separate from the image processing apparatus 120, the image processing apparatus 120 can further include interface(s) for connecting those units.

Figure 2:
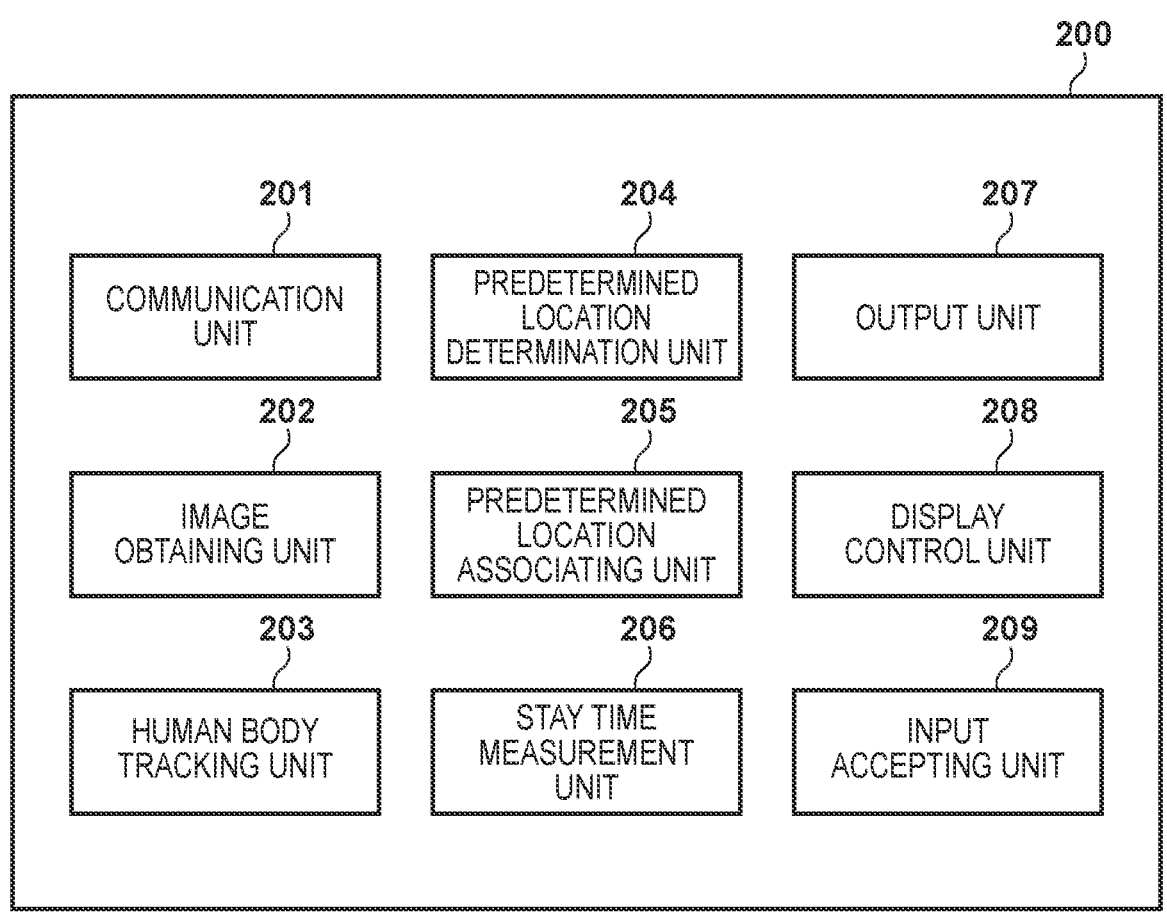
FIG. 2 is a diagram illustrating an example of the functional configuration of an image processing apparatus according to an embodiment.

The functional configuration of the image processing apparatus 120 corresponding to this embodiment will be described next with reference to FIG. 2. FIG. 2 is a block diagram illustrating an example of the functional configuration of the image processing apparatus 120 according to this embodiment. The functions realized by each function block will be described below.

A communication unit 201 communicates with the image capturing apparatus 110 over the network 130. An image obtaining unit 202 obtains an image obtained from the image capturing apparatus 110 through the communication unit 201, or an image stored in the auxiliary storage unit 123, as an image to be processed. The image may be a still image or a moving image. The moving image is constituted by a plurality of frame images that are continuous (or related) with respect to time, and each frame image (called simple "images" for the sake of simplicity hereinafter) serves as an image to be processed according to the present embodiment. The plurality of images continuous with respect to time may be images obtained by thinning the frame images in a moving image captured by the image capturing apparatus 110. For example, one out of every predetermined number of frame images in a moving image captured by the image capturing apparatus 110 may be obtained and used as the image to be processed.

A human body tracking unit 203 detects a human body (a person), which is an object, present in the image to be processed by analyzing the image. The orientation of the human body (the direction the human body is facing) can also be detected from the face of the human body, a feature amount of the body, and so on. Although the present embodiment describes a situation where the object to be processed is a human body, the object may also include other tangible objects aside from a human body, such as vehicles or the like. The human body tracking unit 203 furthermore identifies and tracks the same human body, among human bodies detected among a plurality of images (frames) that are continuous with respect to time.

A predetermined location determination unit 204 imports signals from the input unit 124. The user operating the image processing apparatus 120 can operate a GUI displayed in the display unit 125 and make inputs through the input unit 124. The predetermined location determination unit 204 sets a predetermined location within an image, and holds predetermined location information pertaining to the set location. The predetermined location information that has been set is held until a change is made thereto. The predetermined location determination unit 204 can also set the same human body detected by the human body tracking unit 203 as the predetermined location. This makes it possible to handle cases where a predetermined location in a store or the like (the location of a reception desk) depends on the location of a human body.

A predetermined location associating unit 205 associates a human body detected by the human body tracking unit 203 (a tracking result for that human body) with the predetermined location determined by the predetermined location determination unit 204. For example, distances between the location of a human body included in the tracking result and a plurality of predetermined locations can be calculated, and the closest predetermined location can be associated with that tracking result. Additionally, a predetermined location present in the direction the human body is facing may be associated with the tracking result, on the basis of the orientation of the human body detected by the human body tracking unit 203. Information indicating a number of detection locations equivalent to the number of analyzed frames is included in the tracking result of the human body detected by the human body tracking unit 203. Accordingly, a distance to the predetermined location may be calculated for each detection location of the same human body, and the predetermined location determined to be the closest to the human body the highest number of times may be associated with the tracking result.

A stay time measurement unit 206 holds a stay start time, a stay end time, and a stay time, in association with information identifying the human body and the predetermined location, as a "stay-unit" in the auxiliary storage unit 123, for each detected human body. In the present embodiment, the time a person has taken in order to be handled at a reception desk or the like in a predetermined location, such as a store or the like, can be measured as the stay time. For example, when a person is lining up in order to be handled at a reception desk, the amount of time that passes from when he or she first entered the line to when he or she has been handled at the reception desk and departs the area of the reception desk can be measured as the stay time. The time spent lining up may instead be excluded, and only the time the person spends being handled at the reception desk may be used as the stay time.

An output unit 207 outputs the stay-unit measured by the stay time measurement unit 206. A display control unit 208 carries out a process for displaying an image obtained from the image capturing apparatus 110 through the communication unit 201, or an image stored in the auxiliary storage unit 123, in the display unit 125 via the plurality of processing blocks 202 to 206. The display control unit 208 can display a GUI for accepting operations from the image processing apparatus 120 in the display unit 125.

An input accepting unit 209 imports signals from the input unit 124. The user operating the image processing apparatus 120 can operate the GUI displayed in the display unit 125 and make inputs through the input unit 124. The user can also set the predetermined location and so on as described earlier through the GUI. Based on the above-described configuration, the image processing apparatus 120 carries out processes such as image analysis, settings, measurements, outputs, and the like.

An overview of the processing executed by the image processing system 10 through the above-described configuration will be described next. First, the image to be processed is analyzed, and the human body serving as the object is detected. If a plurality of human bodies have been detected within the image, those human bodies are identified individually in time series, and the same human bodies are tracked (i.e., the trajectories of human bodies moving are tracked from image to image). If the predetermined location has been set in the image, the time for which the human body stays in that location is measured and associated with the predetermined location. Furthermore, the result of this measurement is output as a file or the like along with time information. At this time, detection information, tracking information, setting information, and the like may be output as well. One or more of the detection information, information identifying the same human body between frames, the setting information, and measurement results may be displayed in the display unit 125.

The flow of the overall processing by the image processing apparatus 120 will be described next with reference to the flowchart in FIG. 3. This processing is realized by the image processing apparatus 120 reading out a program from the auxiliary storage unit 123 of the image processing apparatus 120 into the main storage unit 122, and the CPU 121 then executing that program. The sequence of this processing will be described in detail below.

In step S301, the predetermined location determination unit 204 sets the predetermined location in the image to be processed, which has been obtained by shooting the monitored zone. One or more desired locations can be specified and set as predetermined locations. Information of the predetermined location can be set as coordinate information in the image. For example, X-Y coordinates can be applied to the image generated by the image capturing apparatus 110, and the predetermined location can be expressed as coordinate information (x,y) according to that coordinate system.

In the present embodiment, a location within an image, such as a reception desk, a customer service counter, or a cash register in a store, for example, can be set as the predetermined location. The predetermined location can be set by, for example, an image obtained by the image obtaining unit 202 being in the display unit 125, with the user then referring to the displayed image and using the input unit 124 to input a designated location. When setting the predetermined location, the human body tracking result obtained by the human body tracking unit 203 may be displayed superimposed on the image obtained by the image obtaining unit 202. Alternatively, the predetermined location may be set automatically on the basis of the human body tracking result from the human body tracking unit 203 and an image analysis result obtained by analyzing the image shot of the monitored zone. The configuration may be such that the user can use the input unit 124 to modify the details set automatically. The predetermined location information set within the image in this manner is held in the auxiliary storage unit 123.

Next, in step S302, the image obtaining unit 202 obtains the image to be processed. The image obtaining unit 202 obtains the image from the image capturing apparatus 110 through the communication unit 201, or obtains an image stored in the auxiliary storage unit 123. If the image to be processed is a frame image from a moving image, information of the shooting time is associated with each frame image. The information of the shooting time can be used as the time information at which the human body was detected in the image to be processed.

Next, in step S303, the human body tracking unit 203 detects a human body by analyzing the obtained image to be processed. Furthermore, the human body tracking unit 203 specifies the same human body between images consecutive with respect to time on the basis of the location information of the detected human body, which is stored in the auxiliary storage unit 123. Identification information for identifying the same human body is added to the specified human body and held in the auxiliary storage unit 123. The same identification information is added to the same human body, and the location information of the human body in frame images that are sequential with respect to time is associated with that identification information. This makes it possible to track the movement of the same human body from image to image.

In step S303, the human body tracking unit 203 can specify the direction in which the human body is facing (the orientation) by analyzing the image to be processed. The orientation of the human body can be determined on the basis of a face of the human body, a feature amount of the body, and so on. Information of the orientation of the human body can be generated as, for example, information expressing a slope (angle; for example, 0 degrees, ±30 degrees, ±45 degrees) relative to the X axis or the Y axis in X-Y coordinates applied to the image. For example, when the X axis, which corresponds to the horizontal axis of the image, is taken as a reference, the slope is 0 degrees when the human body is facing perfectly horizontally. If the human body is facing at an angle downward, the slope is −30 degrees. Like the location information, the orientation information obtained in this manner, for each of frame images that are sequential with respect to time, is associated with the identification information of the human body.

Next, in step S304, the human body tracking unit 203 determines whether or not a human body for which the human body tracking has ended is present. As the determination method, if a human body which had been detected as the same human body by the human body tracking unit 203 is no longer detected within the image to be processed, the human body tracking can be determined to have ended for that human body. The tracking may be determined to have ended once a set amount of time has passed after the human body is no longer detected by the human body tracking unit 203.

Next, in step S305, the predetermined location associating unit 205 associates the tracking results for the same human body with the predetermined location. The predetermined location associating unit 205 obtains the location information of the detected human body, held in the auxiliary storage unit 123, and associates that location information with the predetermined location. If there are a plurality of predetermined locations, which predetermined location the detected human body belongs to is specified as well. The result of associating the predetermined location is held in the auxiliary storage unit 123. A specific method for associating the tracking result with the predetermined location will be described later with reference to FIGS. 4 to 6.

Next, in step S306, the stay time measurement unit 206 determines the stay time. The stay time measurement unit 206 obtains the time information of each image, the identification information of the human body, and the tracking result, which are held in the auxiliary storage unit 123. The stay time of the human body is measured on the basis of the obtained information. For example, the time at which a human body was detected is specified on the basis of a capturing time of the image in which the human body was detected. The amount of time until it is then determined that the same human body is not within a set distance from the predetermined location is then measured, and that time can be taken as the stay time. The capturing time of an image in which the same human body was first detected, or the capturing time of an image in which the human body was detected when that human body was within a set distance from the predetermined location, can be taken as a starting time of the stay time. The capturing time of an image in which the same human body that had been continuously detected has been detected at a location greater than a set distance from the predetermined location, or the capturing time of an image where that human body was last detected, can be taken as an ending time of the stay time. A process for measuring the stay time will be described later with reference to FIGS. 4 to 6. The measured stay time is associated with the identification information for specifying the human body and the information for specifying the predetermined location, and is held in the auxiliary storage unit 123. The output unit 207 may output the selected stay-unit at an appropriate timing. The display control unit 208 may display information of the stay-unit in addition to the image.

Next, in step S307, the image obtaining unit 202 determines whether or not there are any unprocessed images. The process returns to step S302 if there is an unprocessed image. However, if there are no unprocessed images, the process ends.

An example of the processing carried out by the predetermined location associating unit 205 and the stay time measurement unit 206 will be described next with reference to FIG. 4. An image 400 includes a reception desk 401, a predetermined location 402, a predetermined location 403, and a predetermined location 404. These correspond to a reception desk, a customer service counter, or the like located in a store or the like, for example. Specifically, in a situation where a customer attempting to enter a movie theater is lined up to purchase a ticket, the ticket can be purchased at a customer service counter corresponding to one of the predetermined locations 402 to 404. At this time, the customer is detected in each frame as a human body, and moves within the image, stays in front of a customer service counter, and the like as time passes.

Figure 4:
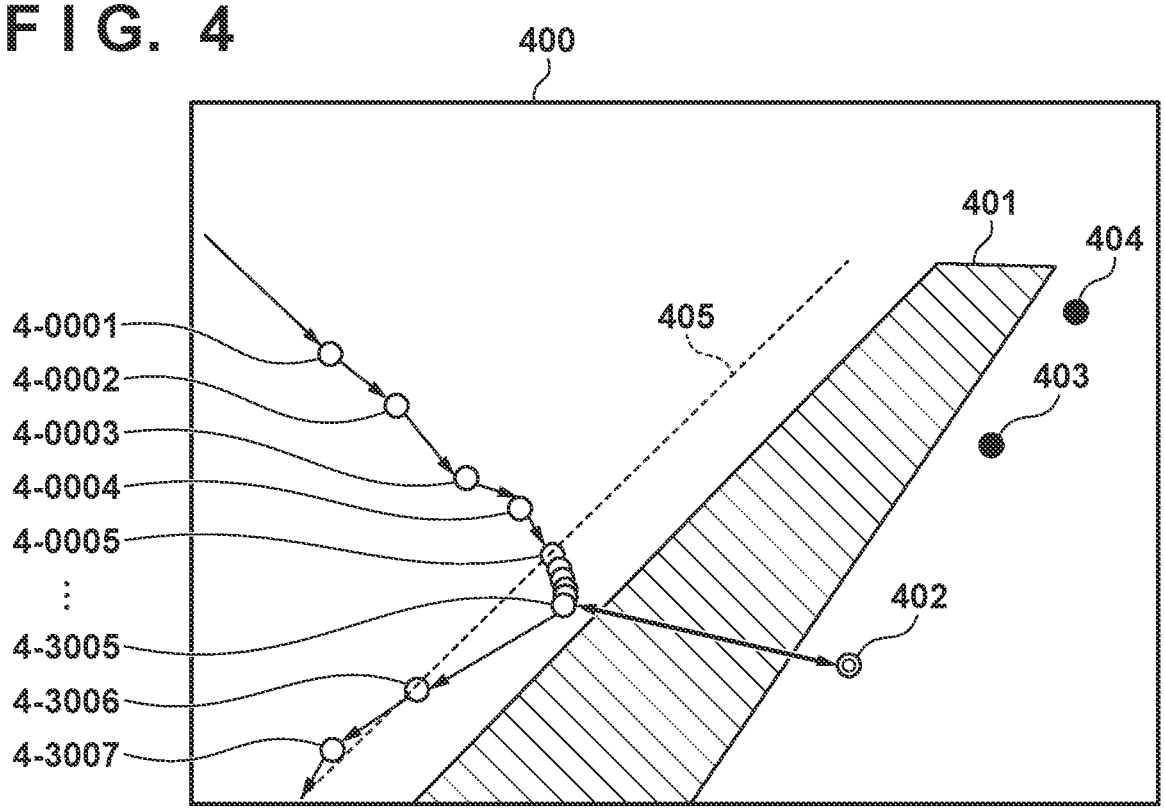
FIG. 4 is a diagram illustrating an example of processing according to an embodiment.

In FIG. 4, points 4-0001 to 4-3007 indicate locations where the same human body has been detected. The points 4-0001 to 4-3007 correspond to a total of 3007 sequential frames. Furthermore, the points 4-0001 to 4-3007 can indicate tracking results for the same human body. In the tracking results indicated by the points 4-0001 to 4-3007, the predetermined location having the highest correlation with that human body is estimated to be the predetermined location 402 on the basis of the distance to the human body, and thus the predetermined location 402 is associated. Here, the distance can be calculated on the basis of coordinates indicating the locations of the human body in the image, and coordinates indicating the locations of the predetermined locations 402 to 404 in the image.

In the example of FIG. 4, a distance between a point 4-3005 and the predetermined location 402 is determined to be the shortest, and thus the predetermined location closest to the location of the human body in the tracking result is specified as the predetermined location 402. As a result, the tracking result for the human body from points 4-0001 to 4-3007 indicated in FIG. 4 is associated with the predetermined location 402. The distance between the location of the human body and the predetermined location may be determined on the basis of the distance within the image, as described above, or may be determined having first transformed the image into coordinates indicating the actual space of the monitored zone.

For example, if the image capturing apparatus 110 is shooting the monitored zone at angle from above as indicated in FIG. 4, objects located further from the image capturing apparatus 110 will appear smaller in the image. As such, by associating the positions of pixels in the image with positions in the space of the monitored zone (coordinate transformation), the positions of objects in the image can be projected onto the space of the monitored zone and associated with positions in the actual space. This makes it possible to calculate the distance between the location of the human body and the predetermined location on the basis of positions in the actual space of the monitored zone. Note that the space may be expressed three-dimensionally, or may be expressed two-dimensionally, as a plan view, a floor plan, or the like.

When selecting a single predetermined location for association from a plurality of predetermined locations, the selection may be made on the basis of the minimum distance between the location of the human body and the predetermined location, or the totals of the distances to the locations of all detected human bodies for each predetermined location may be compared with each other and the predetermined location with the smallest total distance may be selected. The direction in which the detected person is facing (the orientation) may be taken into consideration in addition to the distance.

There are multiple methods for measuring the stay time. For example, the total time for which the same person has been detected within the image can be taken as the stay time. In the example of FIG. 4, the time from points 4-0001 to 4-3007 corresponds to the stay time. Alternatively, periods where the human body is moving may be excluded, and only times for which the human body is substantially stopped (at rest) in relation to the predetermined location, or is in a static state (i.e., a movement amount specified between images is less than or equal to a predetermined value), may be taken as the stay time. Specifically, points 4-0001 to 4-0005 have longer gaps between locations where the human body is detected (longer movement distances). The human body can thus be determined to be moving, and those points can be excluded from the stay time.

On the other hand, points 4-0005 to 4-3005 have short distances from the predetermined location, and the movement distances are short as well. The human body can therefore be determined to be staying while at those points, and the time can be measured. Points 4-3005 to 4-3007 have longer gaps between locations where the human body is detected and longer movement distances. The human body can thus be determined to be moving, and those points can be excluded from the stay time. A detection location of a human body for which the distance from the associated predetermined location is determined to be greater than or equal to a predetermined value, or a detection location of a human body determined not to be present within a predetermined range from the predetermined location, can be excluded as well. For example, if only detection locations closer to the predetermined location than a dotted line 405 are to be included in the state time, points 4-0001 to 4-0004 and 4-3007 may be excluded from the stay time. As described thus far, the stay time can be measured, from the tracking results, having associated the human body with the predetermined location.

Figure 5:
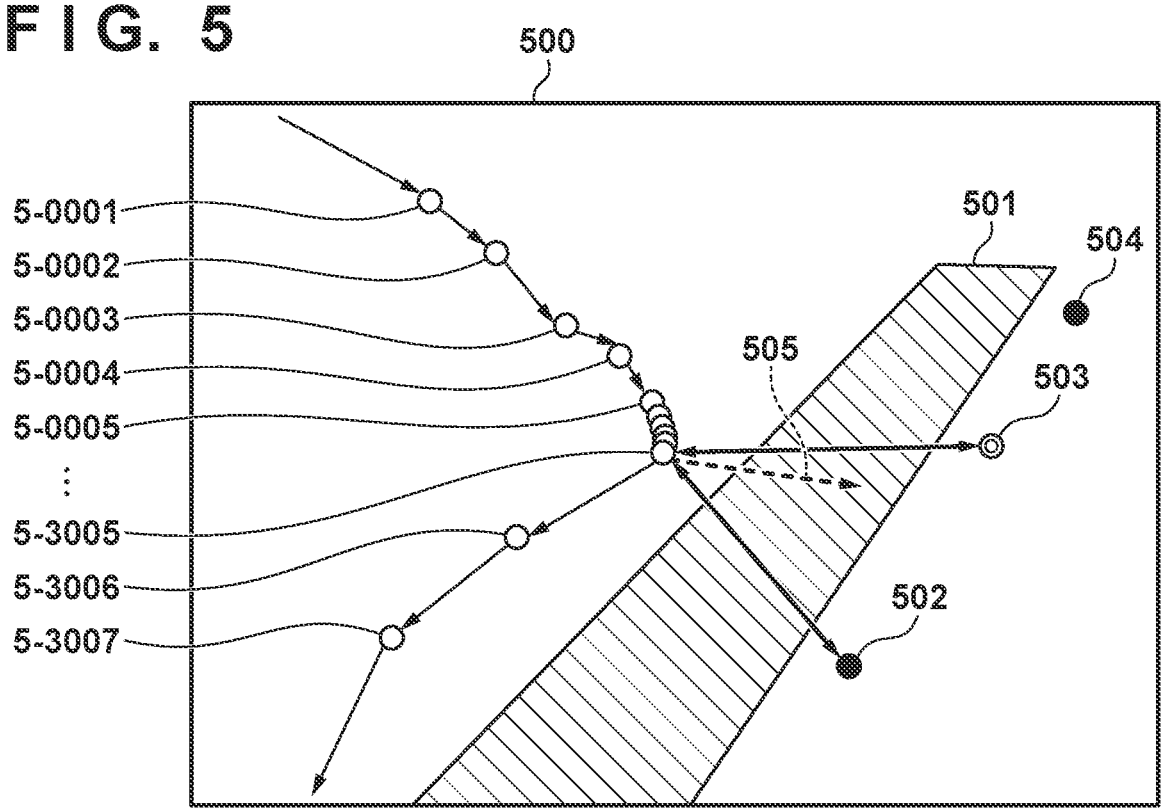
FIG. 5 is a diagram illustrating an example of processing according to an embodiment.

Another example of the processing carried out by the predetermined location associating unit 205 and the stay time measurement unit 206 will be described next with reference to FIG. 5. As in FIG. 4, a reception desk 501, a predetermined location 502, a predetermined location 503, and a predetermined location 504 are present in an image 500. Points 5-0001 to 5-3007 are the same as in FIG. 4, and will therefore not be described. In FIG. 4, the predetermined location to be associated is determined on the basis of a distance between the location of the human body in the tracking results and the predetermined locations. However, in FIG. 5, it is possible that the predetermined location 502 has a shorter distance from the detection location at point 5-3005 in the image, among the predetermined locations 502 and 503. In such a case, rather than basing the selection on the distance between the location of the human body and the predetermined location, the predetermined location is selected on the basis of the orientation of the detected person, with a predetermined location corresponding to that orientation being selected.

For example, if the orientation of a human body detected at point 5-3005 is an orientation indicated by an arrow 505, the orientation indicated by the arrow 505 with respect to a line segment connecting the point 5-3005 with the predetermined location 503 is shifted less than the orientation indicated by the arrow 505 with respect to a line segment connecting the point 5-3005 with the predetermined location 502. As such, in the example illustrated in FIG. 5, the predetermined location 503 can be determined to be present near the orientation 505 of the detected human body, and thus the predetermined location 503 is associated with the tracking result. The measurement of the stay-unit is the same as that described with reference to FIG. 4, and will therefore not be described here. As described thus far, the stay time can be measured in association with the predetermined location, from the tracking results.

When selecting a single predetermined location for association from the plurality of predetermined locations as described above, the predetermined location may be selected on the basis of the orientation of the human body in an area (location) where that human body is static for a long time. For example, if a difference in detection locations of the human body between frames that are sequential with respect to time continuously (i.e., over a predetermined plurality of frames) falls within a predetermined range, the human body can be considered to be at rest in a given area or location. In other words, the human body at that area or location can be considered to have a small amount of movement, being a static state, not be moving, or be at rest. Additionally, the predetermined location may be selected having determined the orientation at all of the detection locations, with the predetermined location selected the most overall being used for the association. The distances between the detected person and the predetermined locations may be taken into account in addition to the orientation.

Figure 3:
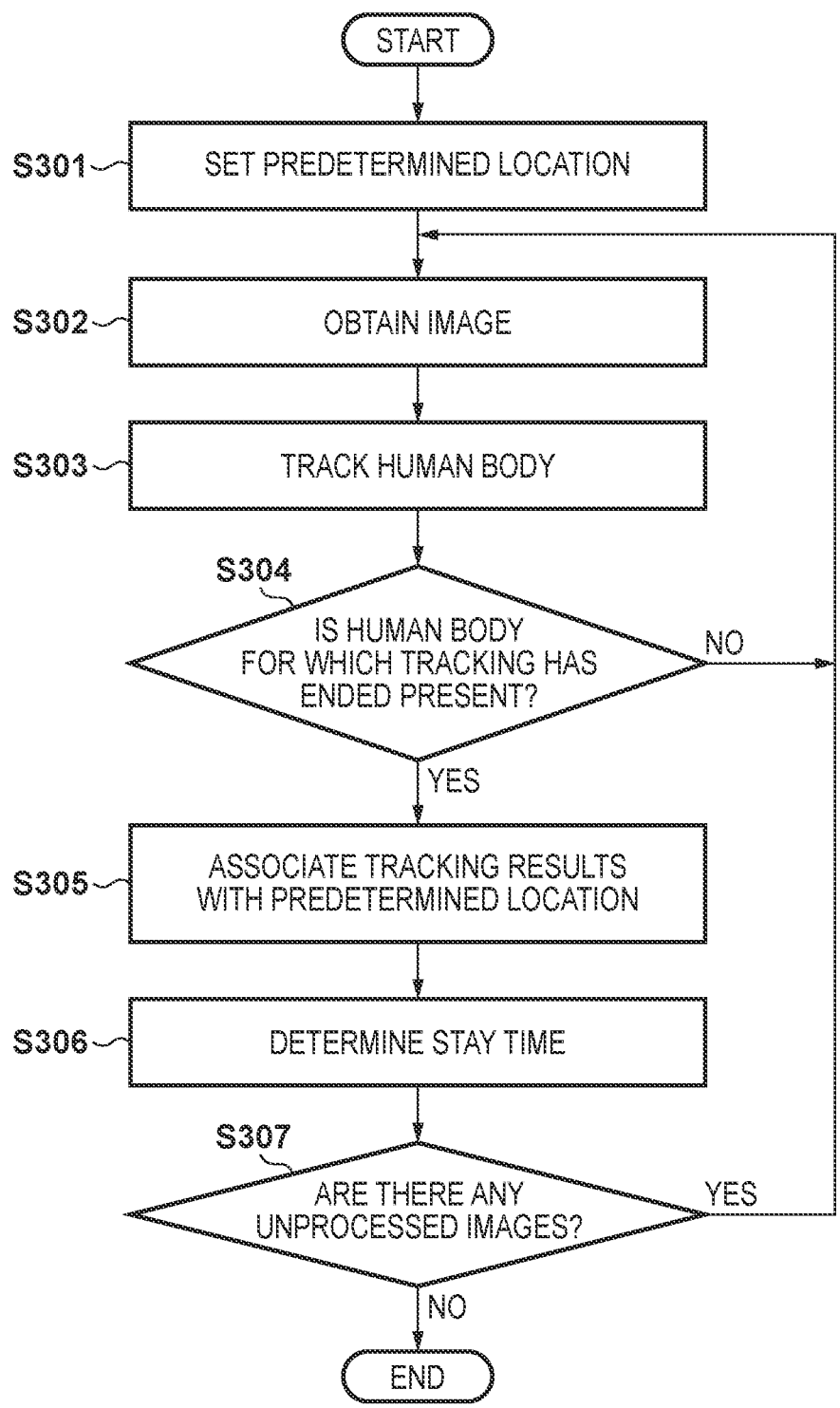
FIG. 3 is a flowchart illustrating an example of processing according to an embodiment.

Next, an example of the data structure in a table in which measurement results generated on the basis of the processing illustrated in FIG. 3 are registered will be described with reference to FIG. 6. FIG. 6 is a diagram illustrating an example of a table in which measurement results are registered, according to an embodiment.

The information in a table 600 is held in the auxiliary storage unit 123. The rows in the table 600 indicate stay-units, including the stay time for which the corresponding human body is associated with each predetermined location, for each of the human bodies. A column 601 indicates the stay start time of the human body. YYYY/MM/DD is expressed in a format in which YYYY represents the year according to the Western calendar, MM represents the month, and DD represents the day, the display format is not limited thereto. A column 602 indicates the stay end time of the human body. Human body identification information for identifying the same human body is registered in a column 603. A human body detected in the image to be processed can be identifies as the same human body throughout a plurality of images by using this human body identification information.

Columns 604, 605, and 606 indicate stay times for which the human body stays in the predetermined location. The number of predetermined locations that can be set need not be limited as long as that number of locations can be processed. Furthermore, although the stay time is expressed in a format where hours, minutes, and seconds are separated by colons, e.g., "00:05:00", the stay time is not limited to this display format. The stay time may be displayed in units of seconds, milliseconds, and so on.

Although the location information, orientation information, and so on of the detected human body are omitted from FIG. 6, that information can be held in the auxiliary storage unit 123 in association with the time at which the human body was detected (the shooting time of the image) and the human body identification information 603.

According to the present embodiment, the stay times of human bodies in predetermined locations can be measured at a place where customers are handled, such as a reception desk, a customer service counter, or a cash register in a predetermined location in a store, a theater, a movie theater, a stadium, a hospital, a station building, or the like. At this time, it is not necessary to set an area for measuring the stay time, and the amount of time taken to be handled at the reception desk or the like present at the predetermined location can be measured accurately. Furthermore, in the present embodiment, an average time for which a person has stayed at each predetermined location can be found, which makes it possible to statistically measure the stay time for each person. As a result, work can be improved and made more efficient, for example by optimizing the distribution of personnel.

Although an exemplary embodiment has been described above, the disclosure is not intended to be limited to this embodiment, and many variations and alterations can be made within the scope thereof.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-097071, filed on May 23, 2019, which is hereby incorporated by reference herein in its entirety.

What is claimed is:

1. An image processing apparatus comprising:
   one or more processors; and
   a memory storing one or more programs configured to be executed by the one or more processors, the one or more programs including instructions for:
      detecting an object and tracking the object in images to be processed, the images being sequential with respect to time;
      determining a stay time for which the object stays in one area for a plurality of predetermined locations of receptions on the basis of a result of the tracking instead of in each of sub-areas associated with one of the plurality of predetermined locations; and
      specifying, on the basis of the result of the tracking, one predetermined location from the plurality of predetermined locations included in the images to be processed, and associating the specified one predetermined location with the stay time,
   wherein in the specifying, the one predetermined location is specified from the plurality of predetermined locations on the basis of a shortest distance between the object and the plurality of predetermined locations, or an orientation of the object in the result of the tracking, and in the associating, the specified one predetermined location is associated with the determined stay time as a stay time with respect to the specified one predetermined location.

2. The image processing apparatus according to claim 1, wherein when specifying the one predetermined location on the basis of the shortest distance, in the specifying, the one predetermined location, of the plurality of predetermined locations, having the smallest distance from any of locations of the object is specified in the result of the tracking.

3. The image processing apparatus according to claim 1, wherein when specifying the one predetermined location on the basis of the shortest distance, in the specifying, the one predetermined location, of the plurality of predetermined locations, having the smallest total distance from each of locations of the object is specified in the result of the tracking.

4. The image processing apparatus according to claim 1, wherein the images to be processed are images obtained by shooting a predetermined area; and in the associating, the shortest distance in an image obtained is calculated by carrying out a coordinate transform that causes the images to be processed to correspond to a space of the area.

5. The image processing apparatus according to claim 1, wherein when specifying the one predetermined location on the basis of the orientation of the object, in the specifying, the one predetermined location, of the plurality of predetermined locations, is specified on the basis of an orientation of an object closest to each of the predetermined locations in the result of the tracking.

6. The image processing apparatus according to claim 1, wherein when specifying the one predetermined location on the basis of the orientation of the object, in the specifying, the one predetermined location, of the plurality of predetermined locations, is specified on the basis of an orientation of the object considered to be in a static state in the result of the tracking.

7. The image processing apparatus according to claim 1, wherein when specifying the one predetermined location on the basis of the orientation of the object, in the specifying, the one predetermined location, of the plurality of predetermined locations, is specified on the basis of an orientation of an object at each of locations of the object in the result of the tracking.

8. The image processing apparatus according to claim 1, wherein the result of the tracking includes information of a time at which the object has been detected; and in the determining, the stay time is determined on the basis of the information of the time at which the object has been detected.

9. The image processing apparatus according to claim 8, wherein in the determining, the stay time is determined on the basis of an amount of time that has passed from a time at which the object has first been detected to a time at which the object has last been detected, the times being included in the result of the tracking.

10. The image processing apparatus according to claim 8, wherein on the basis of a movement distance of the object among the images to be processed that are sequential with respect to time, in the determining, a period in which the object is determined to be moving is excluded from the stay time.

11. The image processing apparatus according to claim 8, wherein information of detection locations of the object in the images to be processed is included in the result of the tracking; and in the determining, the stay time is determined on the basis of a detection location, among the detection locations of the object in the result of the tracking, that is within a predetermined range from the one predetermined location.

12. A system comprising:

an image capturing apparatus that generates images by capturing images of a predetermined area; and an image processing apparatus that processes the images generated by the image capturing apparatus as images to be processed, the image processing apparatus comprising one or more processors, and a memory storing one or more programs configured to be executed by the one or more processors, the one or more programs including instructions for:

detecting an object and tracking the object in the images to be processed, the images being sequential with respect to time;

determining a stay time for which the object stays in one area for a plurality of predetermined locations of receptions on the basis of a result of the tracking instead of in each of sub-areas associated with one of the plurality of predetermined locations; and specifying, on the basis of the result of the tracking, one predetermined location from the plurality of predetermined locations included in the images to be processed, and associating the specified one predetermined location with the stay time, wherein in the specifying, the one predetermined location is specified from the plurality of predetermined locations on the basis of a shortest distance between the object and the plurality of predetermined locations or an orientation of the object in the result of the tracking, and in the associating, the specified one predetermined location is associated with the determined stay time as a stay time with respect to the specified one predetermined location.

13. A control method for an image processing apparatus, the method comprising:

detecting an object and tracking the object in images to be processed, the images being sequential with respect to time;

determining a stay time for which the object stays in one area for a plurality of predetermined locations of receptions on the basis of a result of the tracking instead of in each of sub-areas associated with one of the plurality of predetermined locations; and specifying, on the basis of the result of the tracking, one predetermined location from the plurality of predetermined locations included in the images to be processed, and associating the specified one predetermined location with the stay time, wherein, in the specifying, the one predetermined location is specified from the plurality of predetermined locations on the basis of a shortest distance between the object and the plurality of predetermined locations or an orientation of the object in the result of the tracking, and in the associating, the specified one predetermined location is associated with the determined stay time as a stay time with respect to the specified one predetermined location.

14. A non-transitory computer-readable storage medium storing one or more programs including instructions that, when executed by a processor of an image processing apparatus, causes the processor to perform the operations of:

detecting an object and tracking the object in images to be processed, the images being sequential with respect to time;

determining a stay time for which the object stays in one area for a plurality of predetermined locations of receptions on the basis of a result of the tracking instead of in each of sub-areas associated with one of the plurality of predetermined locations; and specifying, on the basis of the result of the tracking, one predetermined location from the plurality of predetermined locations included in the images to be processed, and associating the specified one predetermined location with the stay time, wherein, in the specifying, the one predetermined location is specified from the plurality of predetermined locations on the basis of a shortest distance between the object and the plurality of predetermined locations or an orientation of the object in the result of the tracking, and in the associating, the specified one predetermined location is associated with the determined stay time as a stay time with respect to the specified one predetermined location.

* * * * *